(12) United States Patent
Doerfler et al.

(10) Patent No.: US 8,707,541 B2
(45) Date of Patent: Apr. 29, 2014

(54) PROCESS FOR ROUGHENING METAL SURFACES

(75) Inventors: Thomas Doerfler, Erftstadt (DE); Clemens Maria Verpoort, Monheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 933 days.

(21) Appl. No.: 12/815,772

(22) Filed: Jun. 15, 2010

(65) Prior Publication Data

US 2010/0326270 A1     Dec. 30, 2010

(30) Foreign Application Priority Data

Jun. 25, 2009  (DE) .......................... 10 2009 027 200

(51) Int. Cl.
  *B23P 13/04*  (2006.01)

(52) U.S. Cl.
  USPC ........................................................... 29/558

(58) Field of Classification Search
  USPC ................... 29/557, 558, 459, 432; 92/169.1; 72/324; 428/586
  See application file for complete search history.

(56) References Cited

U.S. PATENT DOCUMENTS

| | | | |
|---|---|---|---|
| 3,031,330 A | | 4/1962 | Hornick |
| 3,114,960 A | * | 12/1963 | Einaudi ................... 29/898.067 |
| 3,324,496 A | | 6/1967 | Haracz |
| 4,324,017 A | | 4/1982 | Viehe |
| 4,646,479 A | | 3/1987 | Walker et al. |
| 5,239,955 A | | 8/1993 | Rao et al. |
| 5,363,821 A | | 11/1994 | Rao et al. |
| 5,380,564 A | | 1/1995 | VanKuiken, Jr. et al. |
| 5,480,497 A | | 1/1996 | Zaluzec et al. |
| 5,622,753 A | | 4/1997 | Shepley et al. |
| 5,648,122 A | | 7/1997 | Rao et al. |

(Continued)

FOREIGN PATENT DOCUMENTS

| | | |
|---|---|---|
| DE | 19919024 A1 | 11/2000 |
| DE | 102006045275 B3 | 2/2008 |

(Continued)

OTHER PUBLICATIONS

International Patent Bureau, International Search Report for the corresponding German Patent Application No. DE 10 2008 019 933.8 filed Apr. 21, 2008 and the PCT/EP2009/054670 filed Apr. 20, 2009.

(Continued)

*Primary Examiner* — John C Hong
(74) *Attorney, Agent, or Firm* — Damian Procari; Brooks Kushman P.C.

(57) ABSTRACT

A method of roughening metal surfaces of a workpiece such as a cylinder bore of an internal combustion engine to improve the adhesion of layers thermally sprayed thereon. Uniform grooves are formed in the surface and ridges are arranged between the grooves. The grooves may be formed by a process such as turning, drilling, milling or rolling. The ridges are plastically deformed in order to form undercuts in the grooves, with the degree of plastic deformation of the ridges varying regularly in the longitudinal direction of the grooves. Local deformations are produced in the ridge, and these bring about regular undercuts in the groove. This makes it possible to produce the undercuts in identical dimensions with little effort. Furthermore, since the groove is now not completely constricted by undercuts, it can be filled more effectively with spraying material.

14 Claims, 5 Drawing Sheets

(56) References Cited

U.S. PATENT DOCUMENTS

| | | | |
|---|---|---|---|
| 5,691,004 A | 11/1997 | Palazzolo et al. | |
| 5,820,938 A | 10/1998 | Pank et al. | |
| 5,997,286 A | 12/1999 | Hemsath et al. | |
| 6,395,090 B1 | 5/2002 | Shepley et al. | |
| 6,622,685 B2 | 9/2003 | Takahashi et al. | |
| 7,089,662 B2 | 8/2006 | Izquierdo et al. | |
| 7,415,958 B2 | 8/2008 | Boehm et al. | |
| 7,568,273 B2 | 8/2009 | Iizumi et al. | |
| 7,851,046 B2 | 12/2010 | Nishimura et al. | |
| 8,209,831 B2 | 7/2012 | Boehm et al. | |
| 2005/0064146 A1 | 3/2005 | Hollis et al. | |
| 2009/0175571 A1 | 7/2009 | Boehm et al. | |
| 2010/0031799 A1 | 2/2010 | Ast et al. | |
| 2010/0101526 A1 | 4/2010 | Schaefer et al. | |
| 2010/0139607 A1 | 6/2010 | Herbst-Dederichs et al. | |
| 2011/0000085 A1 | 1/2011 | Kanai et al. | |
| 2011/0023777 A1 | 2/2011 | Nishimura et al. | |
| 2012/0018407 A1 | 1/2012 | Schramm et al. | |

FOREIGN PATENT DOCUMENTS

| | | | |
|---|---|---|---|
| DE | 102008022225 A1 | 11/2009 | |
| DE | 102008024313 A1 | 12/2009 | |
| DE | 102009008741 A1 | 8/2010 | |
| EP | 0919715 A2 | 6/1999 | |
| EP | 1854903 A1 | 11/2007 | |
| JP | 2001245457 A | 9/2001 | |
| JP | 2006097045 A | 4/2006 | |
| JP | 2006097046 A | 4/2006 | |
| JP | 2007277607 A | 10/2007 | |
| WO | 2006061710 A1 | 6/2006 | |
| WO | 2006161710 A1 | 6/2006 | |
| WO | 2007087989 A1 | 8/2007 | |
| WO | 2008034419 A1 | 3/2008 | |
| WO | 2011161346 A1 | 12/2011 | |

OTHER PUBLICATIONS

European Patent Office, European Search Report for the corresponding EP Application No. 10167055.2 mailed Oct. 11, 2011.
C. Werporrt, W. Blulme, R. Ehrenpreis, Ford Motor Company, ICES-2006-1391, Proceedings of ICES2006, Therma Spraying of Aluminum Cylinder Bores by the Ford PTWA Spray Process, 2006 Internal Combustion Engine Division Spring Technical Conference May 7-10, 2006, Aachen, Germany.
Eberhard Kretzschmar, The Metal Spraying Process and its Application in our history, Veb Carl Marhold Publishing House, Halle (Salle), 1953.
German Patent and Trademark Office, German Search Report for the corresponding German Patent Application No. DE 10 2009 027 200.3-45 mailed Mar. 8, 2010.
Machine Translation for JP 2001245457.
Applicants' Statement of Relevance in Accordance With 37 C.F.R. 1.98(a)(3)(i) for IDS Reference JP 2001-245457.
Japanese Patent Office, Japanese Office Action for Japanese Patent Application No. 2010-139542.

* cited by examiner

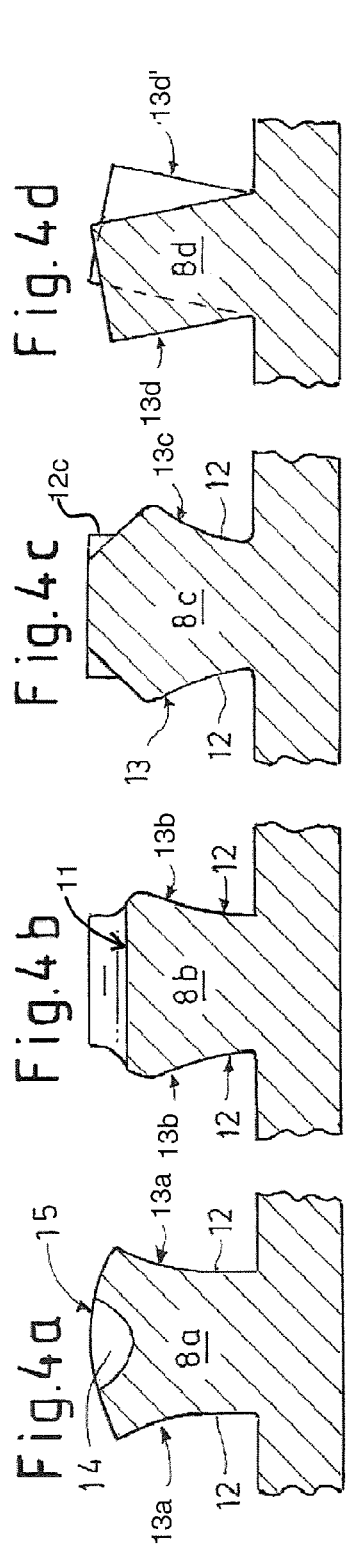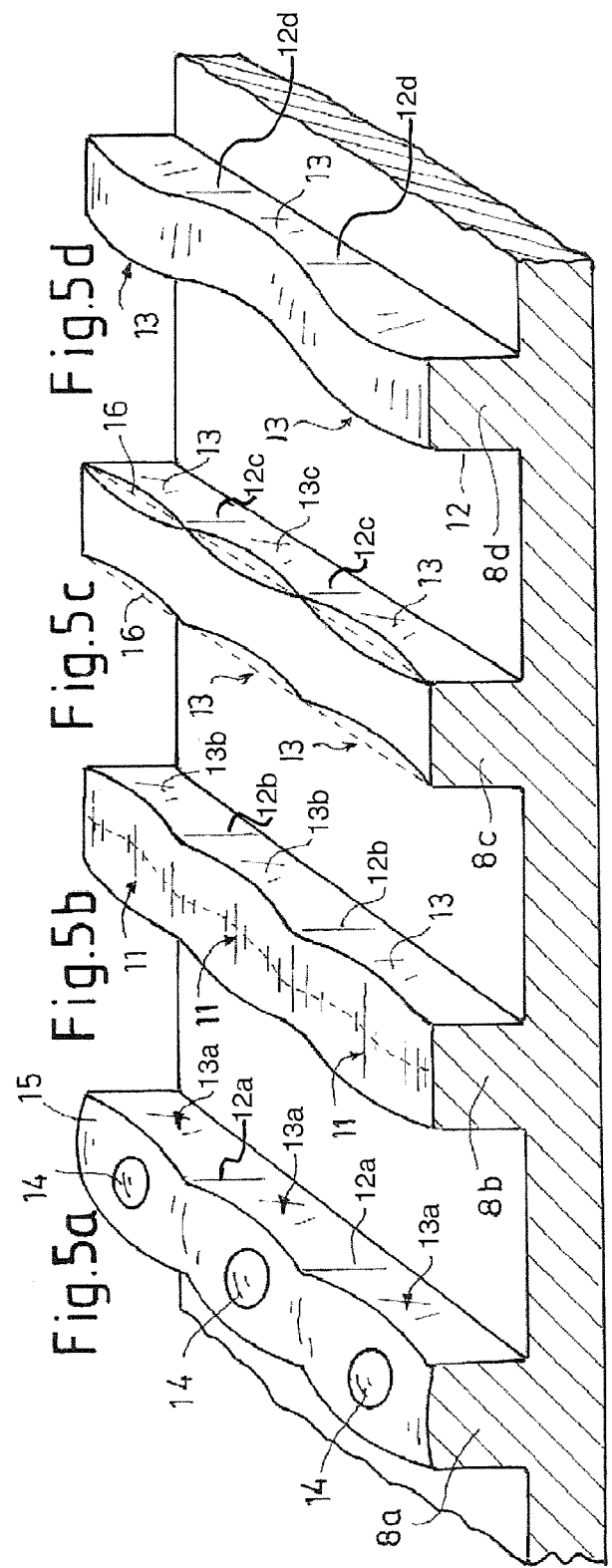

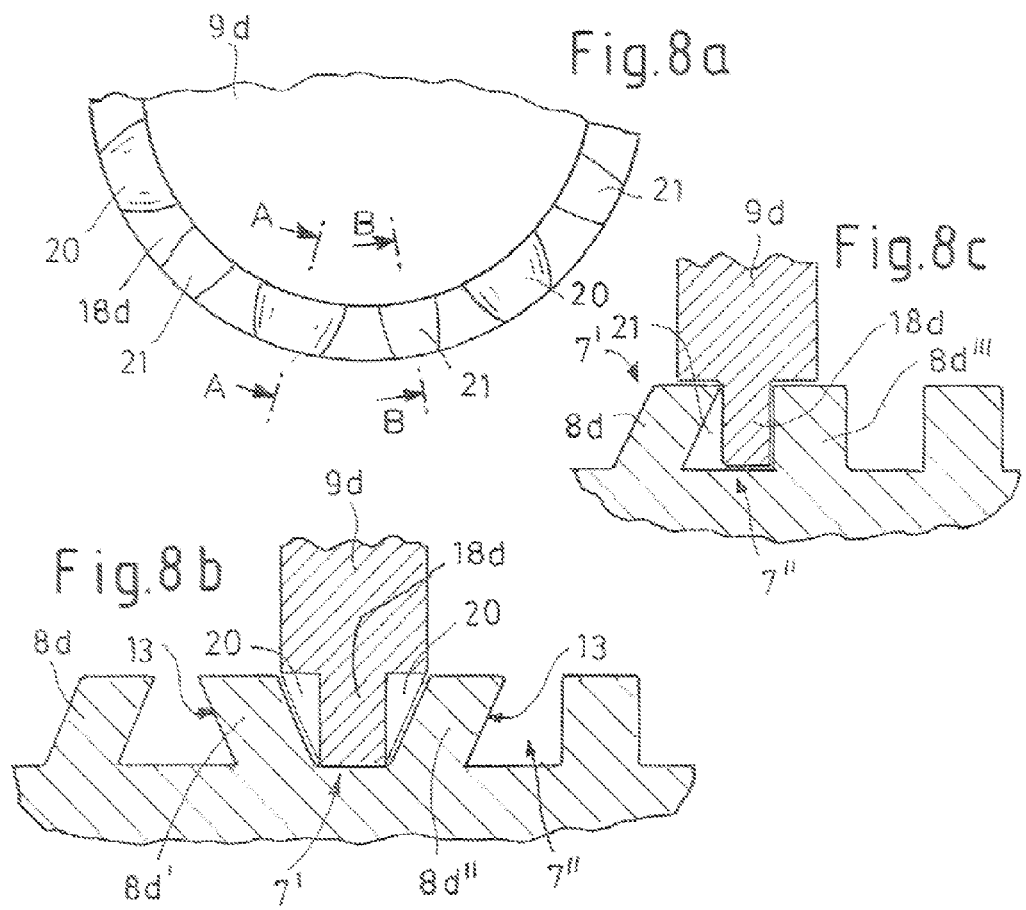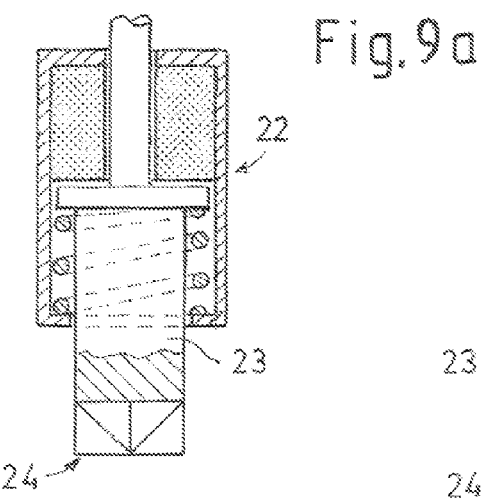

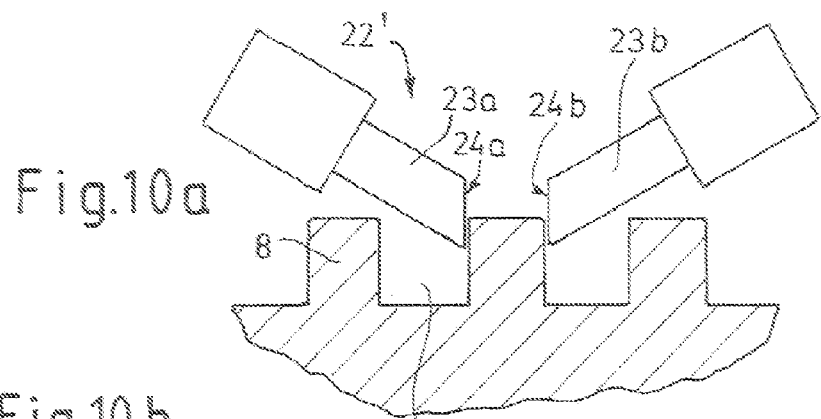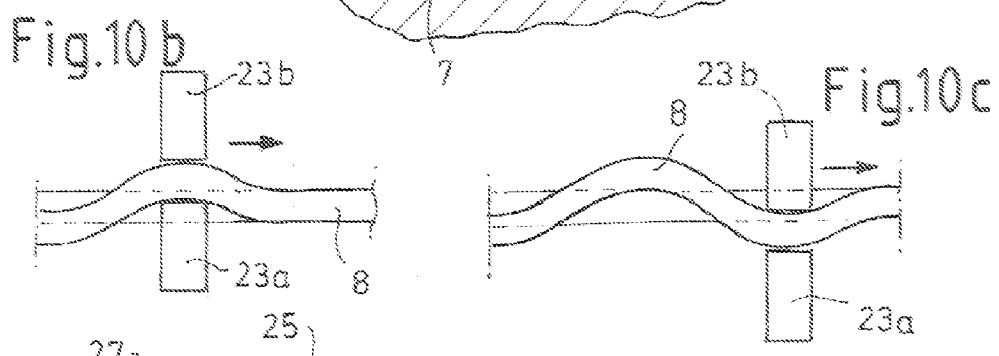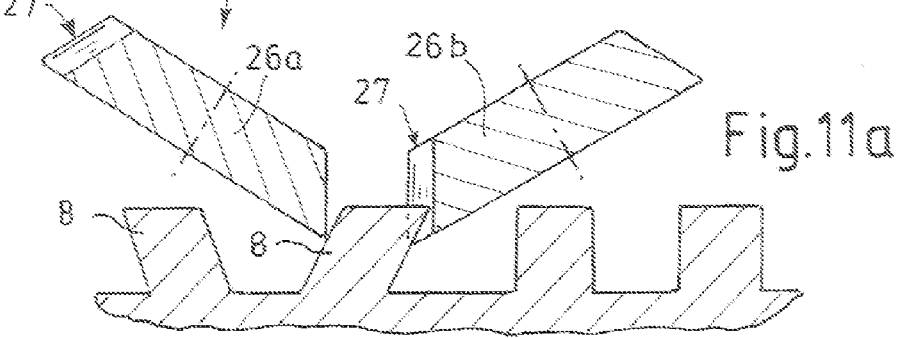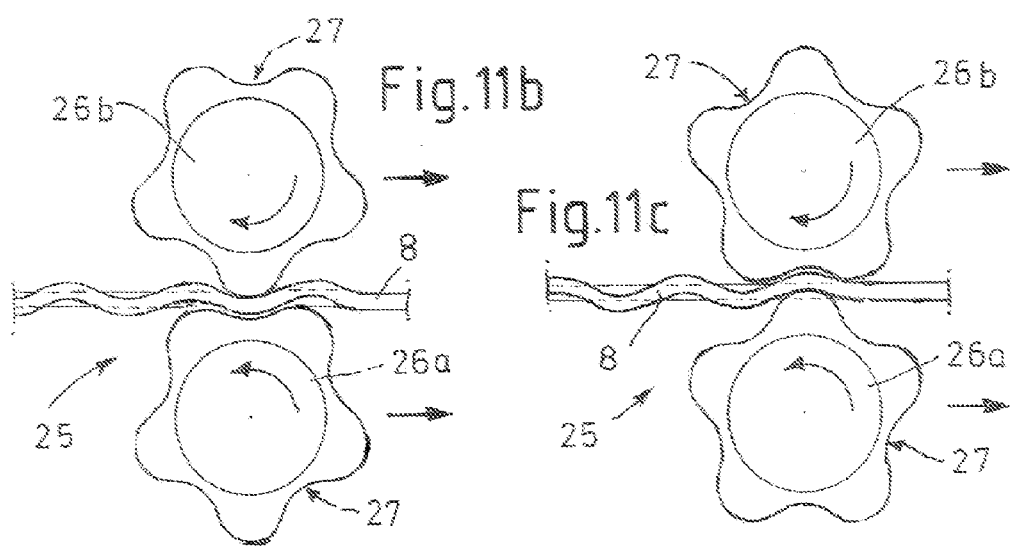

PROCESS FOR ROUGHENING METAL SURFACES

CROSS-REFERENCE TO RELATED APPLICATIONS

This application claims foreign priority benefits under 35 U.S.C. §DE 10 2009 027 200.3 filed Jun. 25, 2009, which is hereby incorporated by reference in its entirety.

BACKGROUND

1. Technical Field

The invention relates to a process for roughening metal surfaces in order to improve the adhesion of layers thermally sprayed thereon.

2. Background Art

WO 2007087989 A1 discloses a process for roughening metal surfaces in order to improve the adhesion of layers thermally sprayed thereon, wherein uniform grooves, e.g. rectangular or trapezoidal grooves, are introduced into the metal surface and resulting ridges are plastically deformed in order to form undercuts along the ridges. A disadvantage of this process is that the ridges are plastically deformed over their entire length. This requires a relatively large effort, it being possible to make the shape of the undercuts constant only with difficulty. Furthermore, the formation of the undercuts over the entire length of the grooves ensures that the grooves are filled completely by the spraying material only to a limited extent, since the adjacent undercuts form a narrow point through which only some of the spraying material can penetrate into a groove.

SUMMARY

Since the degree of plastic deformation of the ridges varies regularly in the longitudinal direction of the grooves, the undercuts can be introduced into the ridges in a targeted manner at regular portions. For this purpose, the ridges are each locally deformed by suitable tools in such a way that these undercuts are produced. As seen in the longitudinal direction of the grooves, this leads to a constant, but regular, variation in the shape of the undercuts. In this case, some of the undercuts may not even occur at all since, at certain points, the degree of plastic deformation is only low or no plastic deformation is present at all.

This regular variation in the groove shape means that the undercuts which then occur regularly can be introduced into the ridges with relatively little effort since, overall, only a small degree of plastic deformation of the ridges is required. Furthermore, the undercuts can be introduced with increased accuracy. As a result, these are produced regularly with identical dimensions along the grooves. This is a major advantage for uniform adhesive strength of the sprayed layer subsequently applied. It is also advantageous that the spraying material to be applied can fill the grooves very well since these regularly do not have any undercuts or have at least relatively small undercuts. In these regions, the spraying material penetrates very well into each groove and can then easily fill the directly adjacent groove regions with the undercuts.

In one advantageous embodiment, the plastic deformations are knurls on the top face of the ridges. For this purpose, a known knurling tool is moved along the groove. Depending on the form of the knurling tool, this produces the uniform plastic deformations according to the flute shape of the knurling tool.

In a further embodiment, the plastic deformations are local indentations on the top face of the ridges. This can be introduced by a roller having corresponding projections, points or needles.

In both cases, the undercuts are produced by pressing the groove with such a force on the top face that the groove is pressed in plastically and, as a result, the groove flanks are deformed plastically toward the side—transversely with respect to the longitudinal direction of the groove.

In another embodiment, the plastic deformations are local mortices in the ridges transversely with respect to the direction of the grooves. This can be done by moving a roller in the groove, this roller having regular projections, points or shoulders on the radial circumference which deform the groove transversely with respect to the longitudinal direction of the groove. The groove is then bent over plastically transversely with respect to the longitudinal direction thereof. Since the ridges remain undeformed in the groove root, the ridges are subjected to more severe deformation, and virtually inclined, in the transverse direction as their height increases, as a result of which the undercuts are produced in the grooves.

The plastic deformations can be local indentations of the ridge edges. This can be implemented by appropriately pressing in or crimping the ridge edges at regular intervals, as a result of which the undercuts are produced on the groove flanks.

A tool for introducing the plastic deformations can have at least one punch. This punch can advantageously move in a cyclic manner. When the tool is guided over the grooves, the moving punch produces the corresponding plastic deformations of the ridges. In this case, the punch can have an appropriately shaped punch head, and the punch can act on the grooves in any suitable direction in order to produce the optimum shape of undercuts on the ridges. By way of example, the punch can act directly perpendicularly on the top face of the ridges, as a result of which the ridges are pressed from above and the ridge material thereby flows in the transverse direction. However, the punch can also act in the transverse direction with respect to the grooves at a shallow angle, as a result of which the ridges are deformed transversely with respect to the longitudinal direction thereof.

A tool for introducing the plastic deformations may be guided in, on, or by a groove. Therefore, it is possible for the tool to always be aligned precisely with respect to the ridges and for only one of the adjacent ridges to be machined. Since the tool is guided on, by, or in the grooves, the ridges are always deformed relative to the groove and the deformation can thus be carried out with high precision and repeatability.

It is particularly advantageous if the plastic deformations in the second process step are introduced in the same operation as the first process step. By way of example, a tool for the plastic deformation can be arranged downstream of a turning, drilling or milling tool. In this case, the tools for the first and second process steps are advantageously mounted on the same tool carrier, e.g. a milling or turning spindle. Therefore, the first and second process steps take place virtually at the same time or in brief succession. In addition to reduced time (no further operation is necessary), the outlay in terms of measurement or apparatus is also reduced for the second process step. Both tools are coupled directly to each other and have to be aligned with respect to each another only once.

The described methods for producing the plastic deformations and the undercuts can be suitably combined. By way of example, plastic indentations from above can alternate with indentations in the transverse direction and/or deformations of the groove flanks. A tool can introduce various plastic deformations and/or a mixture or superposition of said plastic deformations. It is also possible to suitably combine a plurality of tools for carrying out the second process step in order to produce the most beneficial undercuts possible.

The disclosed method is particularly suitable for machining and preparing the coating of cylinder blocks of internal combustion engines. The process is readily useable in the relatively small cylinder bore since it is possible to reliably introduce the undercuts required into the ridges in a very uniform manner with little effort.

BRIEF DESCRIPTION OF THE DRAWINGS

Further advantageous embodiments of the invention are illustrated in the drawings, in which:

FIGS. 4a-d show sections through ridges with different deformations;

FIGS. 5a-d show perspective views of the deformed ridges shown in FIG. 4;

FIGS. 8a-c show a side view and sections of a roller for transverse deformations;

FIGS. 9a-b show a side view and a section of a punch tool for ridge edge deformations;

FIGS. 10a-c show a section and plan views of a punch tool for transverse deformations; and FIGS. 11a-c show a section and plan views of a twin roller for transverse deformations.

DETAILED DESCRIPTION

Figure 1:
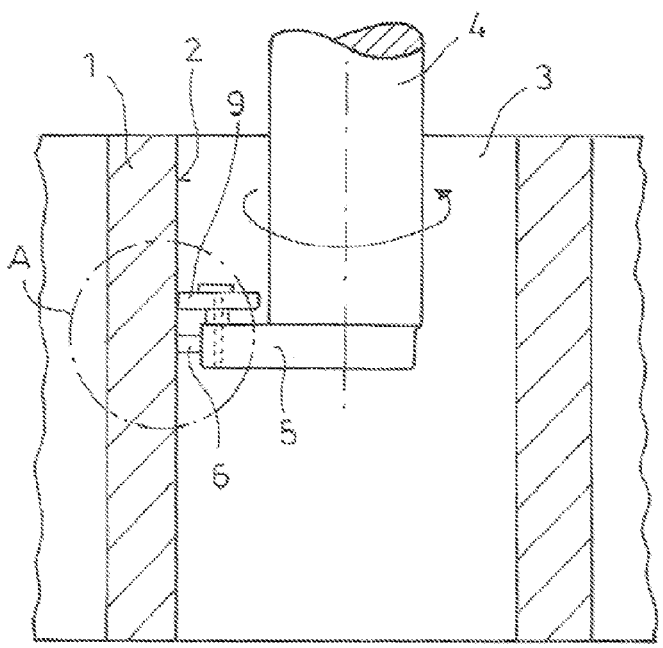
FIG. 1 shows a section through a workpiece and two tools for carrying out a surface roughening process.
Figure 2:
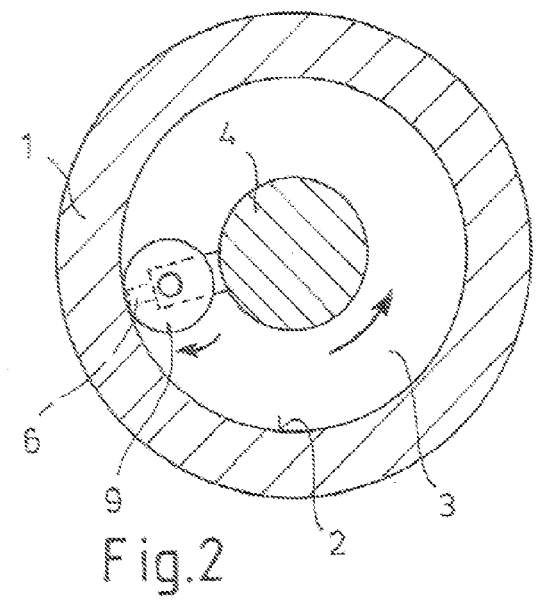
FIG. 2 shows a plan view of the arrangement shown in FIG. 1.
Figure 3:
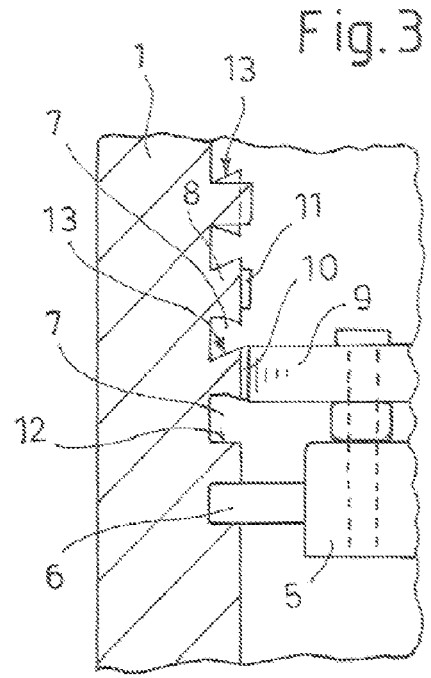
FIG. 3 shows the enlarged excerpt A from FIG. 1.

FIGS. 1 to 3 show an arrangement for carrying out a surface roughening. The workpiece may be, for example, a cylinder block 1 and has a metal surface 2 which is prepared by means of the process in order to make it possible to apply a sprayed layer. A tool holder 5, which bears a turning tool 6, is fastened to a tool spindle 4. Since the tool spindle 4 rotates and slowly moves downward into the cylinder bore 3, the turning tool 6 produces, in the metal surface 2, the grooves 7 which run in the circumferential direction and have the intermediate ridges 8.

A rotatable knurling roller 9 is arranged on the tool holder 5 and acts on the ridges 8 by means of regular projections 10 which are arranged on the circumference and, when the rotary spindle 4 rotates, plastically deform the ridges 8 at regular intervals in the form of knurls or flutes 11. These flutes 11 in turn produce the undercuts 13 on the groove flanks 12 of the ridges 8.

The knurling roller 9 is set back axially—as seen in the axial direction of movement of the rotary spindle—with respect to the turning tool 6, as a result of which the knurling roller 9 always interacts only with a ridge 8 which has just been produced.

FIGS. 4a to 4d show sections through ridges with different deformations and FIGS. 5a to 5d show the associated perspective views.

FIGS. 4a, 5a show the plastic deformation of a ridge 8a, into the top face 15 of which regular central indentations 14 are introduced. The indentations 14 result in plastic deformations, as a result of which the regular undercuts 13 are formed on the groove flanks 12. In this context, regular means that the indentations or undercuts always occur in a repeating pattern and at roughly the same intervals along the longitudinal direction (the length) of the grooves. In the case of a cylindrical bore (as seen in FIGS. 1-3), the longitudinal direction or length of the grooves and ridges extends around the inner circumference of the bore. The cross-section shown in FIG. 4a is taken at one of the longitudinal locations coinciding with an indentation 14, which is the location where the width of the undercut (and therefore the amount of deformation) is at a maximum 13a. This is in contrast with the longitudinal locations on the groove flanks midway between indentations 14, indicated as 12a, where no or minimal undercut is formed. Thus it may be seen that the amount of deformation, as defined by the depth of the indentation and the corresponding amount of undercut formed, varies along the longitudinal direction (the length) of the ridge 8a.

FIGS. 4b, 5b show plastic deformations of a ridge 8b which are produced by a knurling roller, as has also already been shown in FIG. 3. The depressions or knurls or flutes 11 which are produced result in plastic deformation of the ridge material in the transverse direction with respect to the grooves, as a result of which the undercuts 13 are formed. The cross-section shown in FIG. 4b is taken at one of the longitudinal locations coinciding with the deepest point of a depression 11, which is the location where the width of undercut 13b (and therefore the amount of deformation of the ridge 8b) is at a maximum. This is in contrast with the longitudinal locations on groove flanks midway between the evenly-spaced depressions 11 where no or minimal undercut is formed, indicated as 12b. Thus it may be seen that the amount of deformation, as defined by the depth of the depression and the corresponding amount or width of undercut, varies along the longitudinal direction (the length) of the ridge 8b.

FIGS. 4c, 5c show the plastic deformations of the ridge edges 16. Since the ridge edges 16 are regularly pressed in, the regular undercuts 13 are formed. The cross-section shown in FIG. 4c is taken at one of the longitudinal locations coinciding with the maximum downward and outward deformation of the ridge edges 16, which is the location where the width of undercut 13c (and therefore the amount of deformation of the ridge 8c) is at a maximum. This is in contrast with the longitudinal locations on groove flanks midway between the locations 13c of maximum deformation, where no or minimal undercut is formed, indicated as 12c. Thus it may be seen that the amount of deformation, as defined by the amount of downward and outward deformation ("flattening") of the ridge edge 16 and the corresponding amount or width of undercut, varies along the longitudinal direction (the length) of the ridge 8c.

FIGS. 4d, 5d show the plastic deformations of the ridge 8d itself, in that said ridge is regularly and alternately bent toward the side in one direction and the other in the transverse direction with respect to the longitudinal direction of the grooves. As a result, the undercuts 13 are formed alternately to the left and to the right—as seen in the longitudinal direction of the grooves—on the groove flanks 12. The cross-section shown in FIG. 4d is taken at one of the longitudinal locations coinciding with the maximum leftward deformation of the ridge 18d, which is the location where the width of left flank undercut 13d is at a maximum. Also indicated in FIG. 4d is an occurrence of the maximum rightward deformation of the ridge 18d and corresponding maximum right flank undercut 13d'. Midway between these locations 13d, 13d' are the longitudinal locations where no or minimal undercut is formed, indicated as 12d in FIG. 5d. Thus it may be seen that the amount of deformation, as defined by the amount of leftward or rightward deformation ("leaning") of the ridge 18d and the corresponding amount or width of undercut, varies along the longitudinal direction (the length) of the ridge.

Various tools for producing the ridges as described herein are shown in the subsequent Figures. These tools can also be combined with each other such that different deformations are produced by one tool; however, it is also possible for a plurality of these tools to be arranged alongside each other or in succession, in order to obtain different plastic deformations.

Figure 6A:
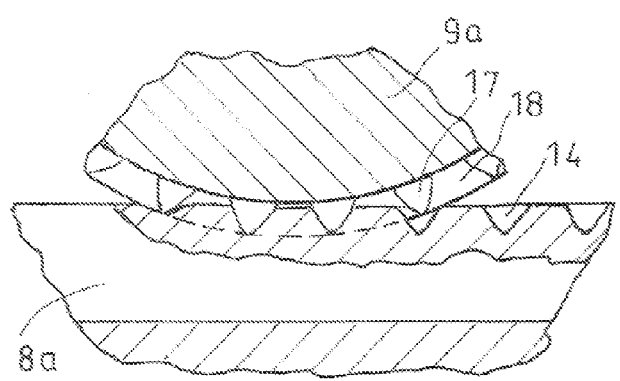
FIGS. 6a-b show a side view and a section of a roller for indentations.
Figure 6B:
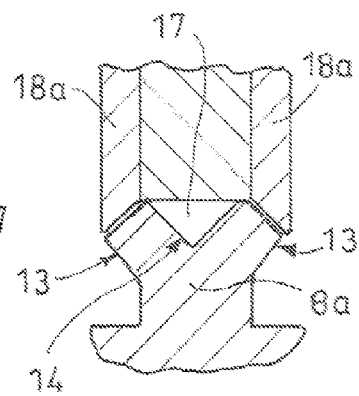

FIGS. 6a and 6b show a roller 9a which can be used to introduce indentations 14 into the top face 15 of a ridge 8. In FIG. 6a, the roller 9a is cut in its center plane. FIG. 6b shows the section A-A shown in FIG. 6a. Cone points 17 are integrally formed on the outer circumference of the roller 9a at regular intervals. When the roller 9a rolls on the top face 15 of a ridge 8a in the direction of the grooves, the indentations 14 are formed as plastic deformations in the ridge 8a and form the undercuts 13 already described in FIGS. 4a and 5a. The roller 9a is guided on the ridge 8a via two radially protruding guide disks 18a which are arranged on the sides of the roller 9a. Therefore, the roller 9a centers itself with respect to the middle of the ridge 8a, and it is ensured that the indentations 14 are always made precisely in the middle of the top face 15. So that the guide disks 18a do not become blocked with the plastically deformed ridge 8 in the region of the indentations 14, the guide disks 18a are cut out radially and axially in the region of the cone points 17.

Figure 7A:
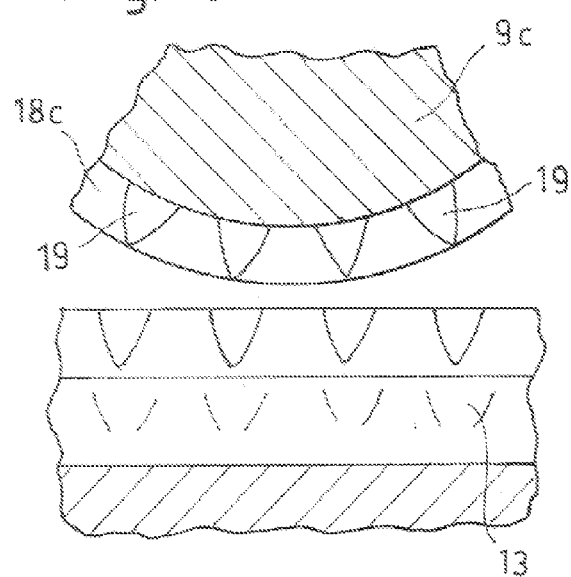
FIGS. 7a-b show a side view and a section of a roller for ridge edge deformations.
Figure 7B:
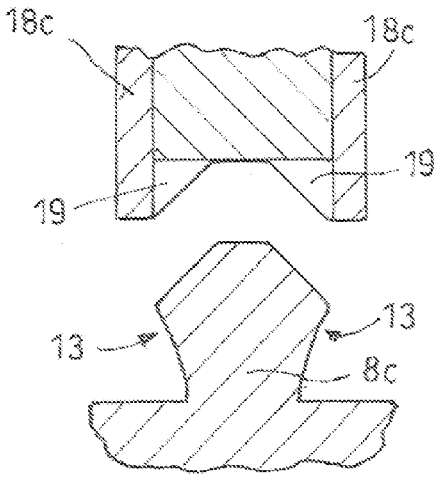

FIGS. 7a and 7b show a roller 9c which is used to plastically deform ridge edges 16. In FIG. 7a, the roller 9c is cut in its center plane. FIG. 7b shows the section B-B shown in FIG. 7a. The roller 9c is also guided on the ridge 8c via two radially protruding guide disks 18c which are arranged on the sides of the roller 9c. Triangular shoulders 19 are integrally formed on the outer circumference of the roller 9c at regular intervals. The guide disks 18c and roller 9c are expediently formed integrally so as to provide the shoulders with a higher strength. When the roller 9c rolls on the top face 15 of a ridge 8a in the direction of the grooves, the ridge edges 16 are plastically deformed at regular intervals. These deformations are indentations or crimped portions of the ridge 8c and the ridge edges 16, as a result of which the undercuts 13 already described in FIGS. 4c and 5c are formed.

FIG. 8a shows a side view of a roller 9d which can be used to plastically deform the ridges 8d in the transverse direction. FIG. 8b shows the section A-A, and FIG. 8c the section B-B, shown in FIG. 8a. The roller 9d has a central guide disk 18d which is integrated in the roller 9d and is guided in a groove 7'. At regular intervals, the guide disk 18d has conical projections 20 which start on the outer circumference, i.e. are not yet present there, and then increase toward the axis of rotation of the roller 9d-radially inward. When the roller 9d, guided by the guide disk 18d, rolls in a groove 7, the conical projections 20 result in regular plastic deformation of the ridges 8d, in such a manner that the latter are bent toward the side in the region of the projections 20, as a result of which the undercuts 13 are produced.

In order that a ridge 8d is bent both to the right and to the left, it is necessary, when the roller 9d is guided in the groove 7" adjacent to the groove 7', for the ridge 8d to be deformed by the projections 20 on the other side of the roller 9d in a correspondingly different direction. This can be seen in FIG. 8b, where the roller 9d is guided in the first groove 7' and bends the ridge 8d' to the left and the ridge 8d" to the right. In FIG. 8c, the roller 9d passes through the groove 7" adjacent to the groove 7' and accordingly deforms the ridge 8d'" to the left and the ridge 8d'" to the right. In order for this bending to take place alternately to the right and left in a ridge, the rotation of the roller 9d is aligned between the grooves 7' and 7". This is carried out in that the guide disk 18d, in the region between two projections 20, always has a recess 21 which corresponds to the ridge 8d'" bent over to the right. Therefore, the right-hand shoulder 20' can only ever bend the ridge 8d'" to the left between two bending movements of the ridge 8d'" to the right.

FIG. 9a shows the section through a punch tool 22 for the plastic deformation of the ridge edges 16 (not shown). A punch 23 is mounted in a spring-elastic manner in the punch tool 22 and periodically extends when the punch tool 22 moves along a ridge 8. The movement of the punch can be produced by any suitable actuator or else mechanically by cam disks which are arranged, for example, on the rotary spindle. The punch head 24 has the negative form for the plastic deformation which the punch is intended to exert on the ridge edges 16. FIG. 9b shows the front view of the punch head 24.

FIG. 10a shows the section through a punch tool 22' for the plastic transverse deformation of a ridge 8. Two punches 23a and 23b are mounted in a spring-elastic manner in the punch tool 22' and periodically alternately extend when the punch tool 22 moves along the ridge 8. The punches 23a, b are arranged so as to be inclined in the transverse direction with respect to the grooves 7, in order that the punch heads 24a, b can move at least partially into the groove 7 in order to hit the ridge 8. In this case too, the movement of the punch can be produced by any suitable actuator or mechanically. The plan view of the punch tool 22' in FIG. 10b shows the extended punch 23a which deforms the ridge 8 upward. FIG. 10c shows—in the meantime, the punch tool 22' has moved on along the ridge 8—the downward deformation of the ridge 8 by the punch 23b.

FIGS. 11a-11c show a further embodiment for transverse deformation. A twin-roller tool 25 has the two skew rollers 26a, 26b. The two skew rollers are arranged on both sides of the ridge 8 to be deformed. They are inclined in relation to each other and engage one into the other with their undulating circumferential profile 27, the ridge 8 to be deformed being arranged between the skew rollers 26a, 26b. When the twin-roller tool 25 moves along the ridge 8 and the skew rollers 26a, 26b rotate, the ridge 8 is alternately bent upward and downward, as can be seen from the plan views in FIGS. 11b and 11c.

What is claimed:

1. A method of roughening surfaces of a cylinder bore to improve adhesion of layers applied thereto comprising:
    forming uniform grooves in the surface, ridges being arranged between adjacent grooves; and
    plastically deforming the ridges to form undercuts in the grooves, wherein the degree of plastic deformation of the ridges varies in a regular and repeating pattern along a longitudinal direction of the grooves.

2. The method of claim 1, wherein the grooves have no undercuts at locations spaced from one another at regular intervals along the longitudinal direction.

3. The method of claim 1, wherein the plastic deformation forms flutes or knurls on top faces of the ridges.

4. The method of claim 1, wherein the plastic deformation forms local indentations on top face of the ridges.

5. The method of claim 1, wherein the plastic deformation forms local transverse deformations of the ridges transversely with respect to the longitudinal direction of the grooves.

6. The method of claim 1, wherein the plastic deformation forms local indentations on edges of the ridges.

7. The method of claim 1, wherein the plastic deformation is introduced by a roller which rotates along the grooves.

8. The method of claim 7, wherein a circumference of the roller comprises at least one of projections, shoulders, points, and needles.

9. The method of claim 1, wherein a tool for introducing the plastic deformations comprises at least one punch.

10. The method of claim 1, wherein a tool for introducing the plastic deformations is guided by contact with a groove and/or by a ridge.

11. The method of claim 1, wherein the grooves and the ridges are formed by a single process step.

12. The method of claim 1, wherein the grooves are formed by at least one of a turning process, a drilling process, a milling process, and a rolling process.

13. The method of claim 1, wherein the grooves are rectangular and/or trapezoidal.

14. A method of roughening a surface of a cylinder bore comprising:
   machining the surface to form a series of alternating grooves and ridges having lengths extending circumferentially relative to the bore; and
   plastically deforming the ridges to form undercuts in lateral flanks of the grooves, the width of the undercuts varying in a regular and repeating pattern along the lengths of the grooves.

* * * * *